(12) United States Patent
Roos et al.

(10) Patent No.: US 9,517,773 B2
(45) Date of Patent: Dec. 13, 2016

(54) FUEL CONSUMPTION ANALYSIS IN A VEHICLE

(71) Applicant: SCANIA CV AB, Södertälje (SE)

(72) Inventors: Fredrik Roos, Segeltorp (SE); Linus Bredberg, Tullinge (SE)

(73) Assignee: SCANIA CV AB (SE)

( * ) Notice: Subject to any disclaimer, the term of this patent is extended or adjusted under 35 U.S.C. 154(b) by 66 days.

(21) Appl. No.: 14/443,479

(22) PCT Filed: Nov. 18, 2013

(86) PCT No.: PCT/SE2013/051345
§ 371 (c)(1),
(2) Date: May 18, 2015

(87) PCT Pub. No.: WO2014/077772
PCT Pub. Date: May 22, 2014

(65) Prior Publication Data
US 2015/0314789 A1    Nov. 5, 2015

(30) Foreign Application Priority Data

Nov. 19, 2012  (SE) ...................................... 1251304

(51) Int. Cl.
*G06F 19/00*     (2011.01)
*G06G 7/70*      (2006.01)
*G06G 7/76*      (2006.01)
*B60W 40/02*     (2006.01)
*B60W 40/04*     (2006.01)
(Continued)

(52) U.S. Cl.
CPC .............. *B60W 40/02* (2013.01); *B60W 40/04* (2013.01); *B60W 40/072* (2013.01);
(Continued)

(58) Field of Classification Search
CPC combination set(s) only.
See application file for complete search history.

(56) References Cited

U.S. PATENT DOCUMENTS 4,570,226 A     2/1986  Aussedat
2005/0021222 A1  1/2005  Minami et al.
(Continued)

FOREIGN PATENT DOCUMENTS

DE   10 2009 054079 A1   5/2011
EP       2 320 387 A1    5/2011
(Continued)

OTHER PUBLICATIONS

International Search Report dated Feb. 28, 2014 issued in corresponding International patent application No. PCT/SE2013/051345.
(Continued)

*Primary Examiner* — Bhavesh V Amin
(74) *Attorney, Agent, or Firm* — OSTROLENK FABER LLP

(57) ABSTRACT

Method (400), calculation device (131) and display (130) for causal analysis of the fuel/energy consumption in a vehicle (100), which is driven by a driver (101): Division (401) of the vehicle's fuel/energy consumption over a number of fuel/energy consumers, calculation (402) of the subdivided (401) fuel/energy consumers' fuel/energy consumption in a calculation device (131), and visualization (403) of the subdivided (401) fuel/energy consumers' calculated (402) fuel/energy consumption, on a display (130), which is controlled by the calculation device (131).

22 Claims, 7 Drawing Sheets

(51) Int. Cl.
*B60W 40/072* (2012.01)
*B60W 40/076* (2012.01)
*B60W 50/14* (2012.01)
*B60W 40/09* (2012.01)
*G07C 5/08* (2006.01)
*B60W 40/10* (2012.01)
*B60R 16/023* (2006.01)

(52) U.S. Cl.
CPC .......... *B60W 40/076* (2013.01); *B60W 40/09* (2013.01); *B60W 40/1005* (2013.01); *B60W 50/14* (2013.01); *G07C 5/08* (2013.01); *G07C 5/0825* (2013.01); *B60R 16/0236* (2013.01); *B60W 2050/146* (2013.01); *B60W 2530/10* (2013.01); *B60W 2530/16* (2013.01); *B60W 2540/30* (2013.01); *B60W 2550/12* (2013.01); *B60W 2550/142* (2013.01); *B60W 2550/143* (2013.01); *B60W 2550/308* (2013.01); *B60W 2550/402* (2013.01)

(56) References Cited

U.S. PATENT DOCUMENTS

| | | |
|---|---|---|
| 2006/0089785 A1 | 4/2006 | Sato et al. |
| 2009/0326753 A1 | 12/2009 | Chen et al. |
| 2011/0095878 A1 | 4/2011 | Skaff et al. |

FOREIGN PATENT DOCUMENTS

| | | |
|---|---|---|
| FR | 2 775 749 A1 | 9/1999 |
| FR | 2 956 639 A1 | 8/2011 |
| JP | 2009/031046 | 2/2009 |
| SE | 535 927 C2 | 2/2013 |

OTHER PUBLICATIONS

International Preliminary Report on Patentability dated Feb. 5, 2015 issued in corresponding International patent application No. PCT/SE2013/051345.

When $d < d_{OK}$: "increase distance to the vehicle ahead"

FUEL CONSUMPTION ANALYSIS IN A VEHICLE

CROSS-REFERENCE TO RELATED APPLICATIONS

The present application is a 35 U.S.C. §§371 national phase conversion of PCT/SE2013/051345, filed Nov. 18, 2013, which claims priority of Swedish Patent Application No. 1251304-0, filed Nov. 19, 2012, the contents of which are incorporated by reference herein. The PCT International Application was published in the English language.

TECHNICAL FIELD

The invention pertains to a method, a calculation device and a display associated with a vehicle Specifically, the invention provides a mechanism for causal analysis of fuel consumption in a vehicle.

BACKGROUND

Fuel consumption in a vehicle, and perhaps especially possibilities of reducing fuel consumption, are becoming more important for a vehicle owner as fuel prices increase. In addition to a reduced fuel cost for the owner, there follows a reduced environmental impact with reduced fuel consumption in the vehicle, since the vehicle's exhaust is approximately proportionate to the fuel consumption. In addition, there is no need to stop and refuel as often, which causes a reduced time when the vehicle is at a standstill and thus a more time efficient transport.

Fuel consumption for the vehicle is impacted by energy losses, such as for example energy loss due to rolling friction or combustion efficiency etc. However, the vehicle's fuel consumption is also impacted by factors dependent on how the driver is driving, for example braking losses, which are directly related to a driving manner. Another example is motor friction which is related to how the driver changes gears in the form of gear selection, shift point (i.e. at which engine speed one changes gears), and number of shift steps (i.e. the number of gears, if any, which are skipped when shifting gears).

With existing solutions it is difficult to investigate why a certain vehicle consumes more fuel than another, similar vehicle, even though they are driving along the same or similar road sections. This difference in fuel consumption may be due to differences in driving manner between the respective vehicle driver. It may also be due to increased friction in one of the vehicles, for example because of unnecessarily high rolling resistance as a consequence of low air pressure in the tyres, defective wheel bearings, improper wheel alignment, inappropriately chosen tread or another similar reason. It is thus difficult to discern how large a part of the respective vehicle's fuel consumption may be attributable to driver behaviour and how much may be attributable to vehicle related factors.

If the reason for the higher fuel consumption may be attributable to poor driver behaviour, this may be subject to measure packages in the form of targeted training, and/or incentives in the form of bonus programmes which reward drivers experiencing low fuel consumption. However, this becomes misdirected, for example in the example above, if the vehicle with the higher fuel consumption has a higher fuel consumption resulting from non-driver dependent increased friction as a consequence of any of the reasons mentioned above.

Another problem with high driver-related fuel costs is that these are often related to increased costs of repairs and maintenance, since a vehicle which is driven aggressively consumes more fuel while it is exposed to greater wear and tear, with increased costs of repairs and maintenance as a consequence. In addition to the direct repair cost, a transport vehicle suffers a loss of income for the duration that the vehicle is in a garage, which is of course unfavourable for its owner.

In addition, one may suspect that a driving style with high fuel consumption, for example through fast acceleration, high cruising speed and heavy braking leads to an increased risk of traffic accidents which, in addition to the potential personal suffering which may arise, may lead to further garage repairs and thus associated loss of income.

It is therefore important to be able to detect and reduce driver related high fuel consumption from several perspectives. However, it is difficult to prove how large a part of the fuel consumption is attributable to the driver's fuel demanding driving style, and how large a part is attributable to other factors, such as hilly terrain, heavy load, friction losses or traffic signal intensive urban environments at rush hour.

In addition, cases are conceivable where an energy loss analysis quickly becomes very complex and unintelligible, since several factors come into play and impact the energy losses.

It is therefore difficult to identify and overcome the cause of an increased fuel consumption in a vehicle.

Also, it is not possible to analyse and detect the reason for a change in the vehicle's fuel consumption seen in a longer perspective. Although it is possible to conclude, for example, that the fuel consumption has changed by studying fuel consumption per driven length unit for a longer period of time, it is difficult to draw any direct conclusion from this insight.

There is also a need, with the objective of reducing fuel consumption, of an aid for the driver in order to understand the connection between driving style and fuel consumption. Pursuant to prior art technology, it is possible to keep a log of fuel consumption and driving distances, but again there are several diverging explanation models for differences over time, such as height difference during the driving distance, friction loss, varying load weight etc., in addition to the driver's driving style. This makes it difficult for the driver to understand the direct connection between, for example, gear selection and gear stage selection when driving a vehicle with a manual gearbox, and fuel consumption.

Another need which has arisen is an aid, for example for an owner of a vehicle park, a vehicle garage or for a vehicle manufacturer who carries out a final test of the vehicles before delivery, of locating a fault related to an increased energy loss and thus an increased fuel consumption in a vehicle.

It may be concluded that there remains much to be done in order to reduce fuel consumption in vehicles.

SUMMARY

Therefore an objective of this invention is to be able to analyse a vehicle's fuel consumption, in order to resolve at least one of the above specified problems and thus to achieve a vehicle improvement.

According to a first aspect of the invention, this objective is achieved by a method for causal analysis of fuel consumption in a vehicle. This vehicle is driven by a driver. The method comprises a division of the vehicle's energy consumption over a number of energy consumers. The method also comprises a visualisation, on a display which is controlled by the calculation device, of the subdivided energy consumers' estimated energy consumption. The method also comprises a visualisation of the divided energy consumers' energy consumption, on a display which is controlled by the calculation device.

According to a second aspect of the invention, this objective is achieved by a calculation device for causal analysis of fuel consumption in a vehicle, which is driven by a driver. The calculation device comprises a processor circuit, arranged to calculate the energy consumers' energy consumption and also arranged to control a display. Further, the calculation device comprises a communication module, arranged to communicate the energy consumers' calculated energy consumption to a display, for visualisation.

According to a third aspect of the invention, this objective is achieved by a display for causal analysis of fuel consumption in a vehicle, which is driven by a driver. The display comprises a communication module, arranged to obtain an energy consumer's calculated energy consumption from a calculation device, for visualisation. Further, the display comprises an element for visual illustration of an energy consumers' obtained calculated energy consumption.

By dividing up the energy consumption in a vehicle over different consumers and calculating how much energy or fuel each consumer consumes, an abnormal or divergent increase of a certain energy consumer may be detected, which in turn may trigger a measure. Such measure may comprise a driving style recommendation which is presented to the driver, where an increased value for a driving style related energy consumer is detected. Where an increased value for a vehicle related energy consumption is detected, a measure recommendation may instead comprise a continued trouble shooting within the components that impact this energy consumer. Thus the vehicle's energy consumption may be reduced, which leads to an economic saving, but also to reduced exhausts and pollution, reduced wear and tear of the vehicle and also reduced risk of accidents for the vehicle and its driver. Thus, an improvement of the vehicle is achieved.

Other advantages and other new features are set out in the detailed description of the invention, below.

BRIEF DESCRIPTION OF THE DRAWINGS

The invention is described in further detail with reference to the enclosed figures, which illustrate embodiments of the invention.

DETAILED DESCRIPTION OF EMBODIMENTS OF THE INVENTION

The invention is defined as a method, a calculation device and a display, which may be realised in any of the embodiments described below. This invention may, however, be realised in many different forms and shall not be seen as limited by the embodiments described herein, which are instead intended to illustrate and visualise various aspects of the invention.

Further aspects and features of the invention may become apparent from the following detailed description when considered in connection with the enclosed figures. The figures should, however, only be seen as examples of various embodiments of the invention and should not be seen as limiting the invention, which is limited only by the attached claims. Further, the figures are not necessarily drawn to scale and are, unless otherwise indicated, intended to illustrate the aspects of the invention conceptually.

Figure 1A:
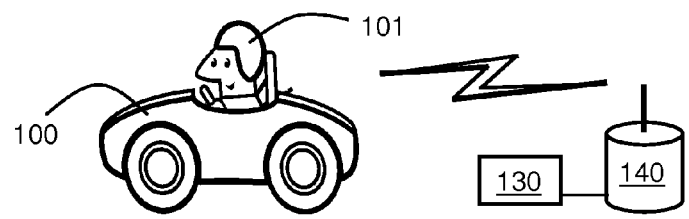
FIG. 1A is an illustration of a vehicle and its driver according to one embodiment.

FIG. 1A shows a vehicle 100, adapted for fuel/energy consumption analysis, and its driver 101. In order to support the propulsion of the vehicle 100 in a fuel/energy efficient manner, and/or in order to be able to detect and identify flaws in the vehicle 100, the driver 101 has access to a method and a system for fuel/energy consumption analysis. The terms fuel and energy are used in this context at least partly interchangeably.

Figure 1B:
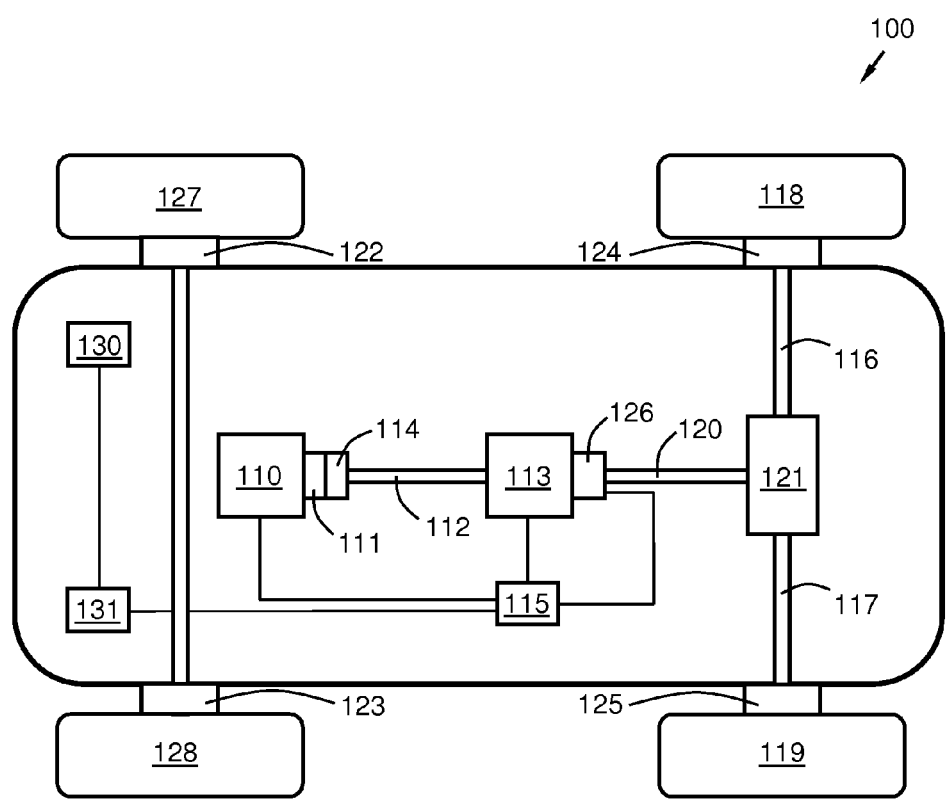
FIG. 1B is an illustration of a vehicle according to one embodiment.

FIG. 1B shows schematically a driveline in the vehicle 100 according to one embodiment of the present invention. The powertrain comprises a combustion engine 110, connected by an output shaft (not shown in the diagram) on the combustion engine 110, for example via a flywheel 111, with an input shaft 112 in a gearbox 113, via a coupling 114. The gearbox 113 may be a manual gearbox, an automatic gearbox or an automated manual gearbox in different embodiments.

The coupling 114 may for example consist of an automatically controlled clutch, which may for example be of a dry plate type. The coupling 114 is controlled by the vehicle's control system via a control device 115. The control device 115 also controls the gearbox 113. The vehicle 100 also comprises drive shafts 116, 117, which are connected to the vehicle's driving wheels 118, 119, and which are driven by an output shaft 120 from the gearbox 113, via a shaft gear 121, such as for example a differential shaft. The vehicle 100, which is schematically shown in FIG. 1B, comprises only two driving wheels 113, 114, but embodiments of the invention are applicable also to a vehicle 100 with several drive shafts 116, 117 equipped with one or several driving wheels 118, 119. The vehicle 100 also has one or several non-driving wheels 127, 128.

The vehicle 100 may also comprise a braking system, which may comprise for example brake discs 122-125 with associated brake linings (not displayed) arranged next to each wheel 118, 119, 127, 128. The brake linings' pressure against the brake discs 122-125 when braking force is generated is controlled with the help of the vehicle's control systems, for example with the help of the control device 115, which may be arranged to send signals to the regulator(s) which regulate braking force in the braking system, when the driver 101 presses a braking pedal or otherwise indicates that braking of the vehicle 100 is desired.

The control device 115 may in some embodiments be arranged to control the vehicle's braking system. It may also, in other embodiments, be arranged to control several of the vehicle's other braking systems, where such systems exist. For example, the vehicle 100 may comprise a retarder 126 and/or other additional braking systems such as an exhaust brake. Based on for example the driver's commands, control signals are sent to suitable system modules, requesting a desired braking force.

The vehicle 100 may also comprise a retarder 126 at the output shaft 120 of the gearbox 113. This retarder 126 may be arranged as for example a hydraulic auxiliary/additional brake, which generates braking power by counteracting, with for example a turbine, the rotation of the gearbox's output shaft 120. The retarder 126 may for example be controlled by the previously described control device 115, or another control device. The retarder 126 may be arranged to cooperate with the braking system, for example via the control device 115 in some embodiments, and may among others be used to relieve the braking system, with the objective of reducing wear and tear and the risk of overheating of the braking discs/brake linings 122-125.

The vehicle 100 also comprises a driver's cab in which a driver environment is arranged in the customary way with instruments, maneuvering controls etc. This driver environment may also comprise at least one display 130 for the presentation of information to the vehicle's driver 101. According to one embodiment of the present invention, the display 130 is used to present energy consumption to the vehicle's driver 101 as described below. The display 130 may for example be controlled by a calculation device 131, which is also configured to implement at least parts of the present invention.

The control system in the vehicle 100 includes a communication bus system, including one or several communications buses to connect a number of electronic control devices (ECU's), or control devices/controllers, and different localised components in the vehicle 100. Such a control system may comprise a large number of control devices, and the responsibility for a specific function may be distributed among more than one control device. Similarly, a control device may be arranged to be responsible for several functions.

The calculation device 131 and control device 115 are in turn arranged to communicate with each other, in order to receive signals and measured values, and potentially trigger a measurement, for example at certain time intervals. Further, the calculation device 131 and the control device 115 are arranged to communicate, for example via the vehicle's communications bus, which may consist of one or several of a cable; a data bus, such as a CAN-bus (Controller Area Network bus), a MOST-bus (Media Oriented Systems Transport), or any other bus configuration; or of a wireless connection, for example according to one of the above listed technologies for wireless communication.

For the sake of simplicity, FIG. 1B above shows only one control device 115, where functions for several different control functions are integrated, such as control of the combustion engine 110, but the vehicle 100 may in other embodiments comprise several control devices, to which the above mentioned control functions may be allocated.

The present invention is in the embodiment illustrated implemented in the calculation device 131, which according to the above, may control the presentation on the display 130, but the calculation device 131 may also consist of a control device dedicated to the present invention. The invention may also be implemented entirely or partly in one or several other control devices already existing in the vehicle, for example the control device 115, or another applicable control device.

Further, the calculation device 131 is adapted to control the display 130 based on other information, received in addition to signals received from the control device 115, for example other control devices arranged in the vehicle 100, when calculating the energy consumption according to the description below.

The calculation device 131 is also arranged to receive sensor signals from different parts of the vehicle 100, directly, or indirectly via the control device 115. Also, the control device 115 may in some embodiments be adapted to receive sensor signals, representing for example different prevailing circumstances in the braking system of the vehicle 100, and signals from for example the retarder 126, in applicable cases, and from the engine control, to mention a few examples.

The control device 115 is also arranged to emit control signals to different vehicle parts and vehicle components. In the present example for example, the control device 115 emits signals to different actuators on a request for braking force, and the control device 115 likewise emits signals to the calculation device 131, which in turn emits signals to the display 130 for presentation of energy consumption according to the description below.

In some embodiments the calculation device 131 is arranged to communicate, via an interface, which may consist of a wireless interface in some embodiments, but may also consist of a wired interface. The wireless interface may consist of a radio transmitter based on wireless communications technology such as 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile Communications/Enhanced Data rate for GSM Evolution (GSM/EDGE), Wideband Code Division Multiple Access (WCDMA), World-Wide Interoperability for Microwave Access (WiMax), Wireless Local Area Network (WLAN) Ultra Mobile Broadband (UMB), Bluetooth (BT) or an infra-red transmitter, mentioned herein as a few possible examples of wireless communication.

The calculation device 131 is in some embodiments arranged to communicate with an external device for data storage 140, see FIG. 1A. This device for data storage 140 may be a part of a Fleet Management System (FMP) in some embodiments. Also, the previously mentioned display 130 may in some embodiments be placed outside the vehicle 100, and may be impacted by the calculation device 131 via a wireless or wired interface as described above.

According to the method of the invention, the energy and the fuel consumed to drive the vehicle 100 is divided into a number of different categories, such as:

Kinetic energy (with the same starting and final speed, this value is zero);

Potential energy, the energy or amount of fuel required to drive uphill (may be both negative and positive), always zero where one starts at the same position as where one finishes;

Air resistance losses, depending on speed and frontal area, fairing, weather, and so on;

Rolling resistance losses, which depend on weight and shaft configuration, tyres, base, weather, wheel alignment, air pressure in the tyres etc.;

Engine (friction) losses, which to a large extent depend on the engine speed, but also on engine type, oil, temperature, etc. This type of loss relates to the so-called trailer effect, i.e. the effect/energy which is required to compensate for the engine's internal losses;

Powertrain losses, losses in gearbox and final gear, depending on torque, gear, speed, temperature, oil etc.;

Braking losses, where all braking usage in a conventional vehicle is 100% loss, while in a hybrid vehicle the loss part of braking energy may decrease to perhaps 30-40%;

Auxiliary systems, i.e. systems such as for example air compressors, AC, generators and others, consume energy which may not be used to drive the vehicle;

The engine's combustion efficiency, losses in the conversion from chemical to mechanical energy. This is the largest single loss in a vehicle with a combustion engine, accounting for over 50% of the chemical energy in the fuel. This is dependent on the engine type, torque, speed, mode in the engine control system, etc.

Some of these categories are driver dependent and will be impacted by, and vary according to, the driver's driving style. Others from among the above listed categories of energy losses are vehicle dependent.

Some embodiments comprise making a calculation in the vehicle 100, or rather in its calculation device 131, regarding the amount of fuel and/or energy consumption for a number of consumers, for example from the list above. In some embodiments the allocation is carried out only to some categories, for example vehicle related consumers and driver dependent consumers. In other embodiments, a finer division of consumers is carried out. Also, it is possible to choose for example only to present driver dependent consumers, in a display 130 placed in the driver's cab, while in other alternative embodiments, only vehicle related consumers are presented, since the intention is to analyse the vehicle 100 in itself and its energy losses.

This calculation may be achieved with models for air and rolling resistance, and information regarding the road's incline, the vehicle's weight and so on. These parameters included may either be measured, for example by sensors or virtual sensors, calculated based on for example stored map information and GPS positioning, or estimated. One may also use adaptive algorithms to calibrate rolling resistance models and models for powertrain losses in some embodiments.

A presentation of the calculated allocation of the vehicle's fuel consumption over different categories of energy losses, or consumers, is carried out according to the above. The presentation may be made on the display 130, in some embodiments on a display 130 placed in the driver's cab, in other embodiments on an externally placed display 130, for example in a so-called Fleet Management System (FMP). In this presentation, for example a bar graph may be visualised, where each category of energy loss in the list above may be represented by a bar or similar.

A calculation and/or assessment may also be made in the calculation device 131 in the vehicle 100, regarding how large a part of each energy loss that is really necessary and how large a part that might have been prevented. For example, an assessment may be made of whether braking could have been avoided if the gas pedal had been released earlier. Another example is an assessment of whether it is possible to drive with a higher gear, and how much energy this would have saved.

Thus an estimation may be obtained, for the measured energy consumer categories above, regarding how much the energy/fuel requirement would have been reduced with a different manner of driving, for example with a different engine speed, with another gear or another vehicle speed. In some embodiments this may also be presented to the driver 101, alternatively in the FMP. In some embodiments a presentation may also be made, on the display 130, of an estimation of how much the driving time would have been impacted by the alternative driving manner, i.e. with a different engine speed, a different gear or a different vehicle speed. In some alternatives, a visualisation of this may also be made by completing the previously mentioned bar graph with, for example, a green colour which shows by how much one would have been able to reduce each bar by driving in a different manner. The colour designation is mentioned here only as an example.

Based on the above calculations, one may also assess whether any component or device in the vehicle 100 seems to consume an abnormal amount of energy. For example, an unusually high rolling resistance may be a sign of poor wheel alignment or abutting brakes 122-125. This too could be presented in the display 130, or alternatively the FMP, for example by activating a warning indicator.

Thus a tool is obtained for the driver 101 to identify his shortcomings from a fuel consumption perspective; and/or for a driving trainer to understand the shortcomings of their taught or coached driver 101 during training/courses. Also, a tool is obtained for a vehicle owner to understand why certain vehicles 100, and/or combinations of vehicles 100 and trailers, in the vehicle fleet consume more fuel than others.

Figure 2A:
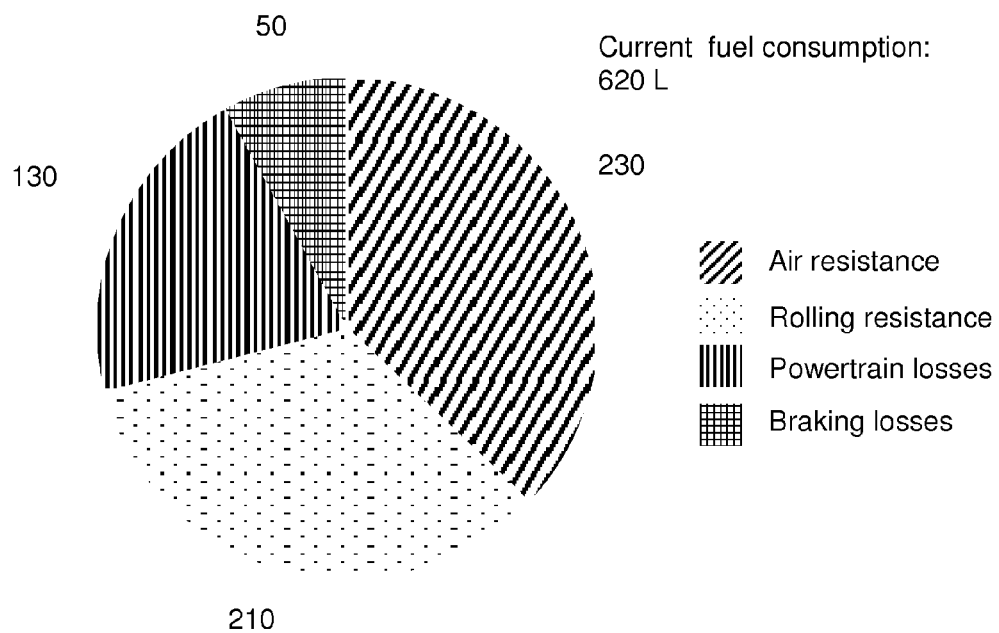
FIG. 2A is an overview showing the current fuel consumption according to one embodiment of the invention.

FIG. 2A shows an example of how the fuel consumption, expressed in liters, in the vehicle 100 may be distributed over a number of fuel consumers. In FIG. 2A, the size of the total fuel consumption is displayed, and how large a part of this the different fuel consumers represent. The visualised fuel consumers and figures shown here are merely illustrative examples; in other embodiments other fuel consumers may be used as previously discussed. A fuel consumer with rest items/other energy losses in some embodiments is also conceivable. In some embodiments, for example only two overall fuel consumers may be presented; driving style related fuel consumers and vehicle related fuel consumers. This division of the vehicle's energy losses into pie pieces is likewise only an example of a visualisation. In different embodiments, one may illustrate the distribution of energy losses over the different fuel consumers in various alternative ways, such as by graph, horizontal, vertical or diagonal bars, numbers, spider diagrams etc.

Figure 2B:
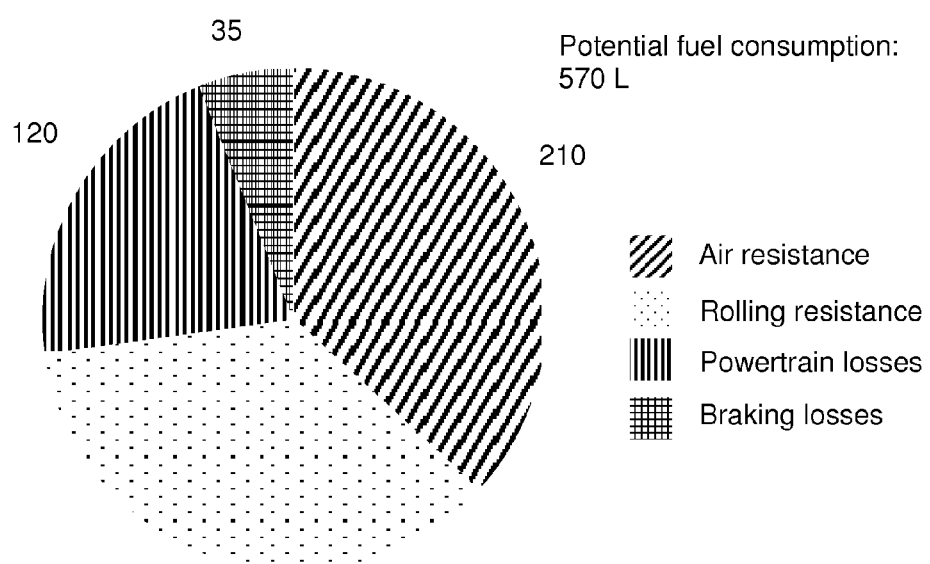
FIG. 2B is an overview showing the potential fuel consumption according to one embodiment of the invention.

FIG. 2B shows an example of how fuel consumption in the vehicle 100, according to the example displayed in FIG. 2A, may be changed if the driver 101 changes driving style in a fuel-economical direction. It may also, based on available information while driving, calculate such a more fuel economical driving manner, which may also be presented to the driver 101 in the form of changing measures in certain embodiments. Examples of such changing measures may be to provide gear recommendations (based on the engine's revolutions), to propose reduced vehicle speed or minimisation of brake usage by planning the driving, to have a good distance to vehicles ahead and to engine brake instead of using the brake. In the example shown, the fuel consumption could be reduced to 570 liters, compared to 620 liters which was the actual consumption, see FIG. 2A, during a certain driving cycle. These values are only examples, and need not relate to a driving cycle but may also relate to an instantaneous estimation in some embodiments. Thus a direct feedback to the vehicle's driver 101 is facilitated, regarding fuel saving measures introduced in the driving style by the driver.

Figure 3A:
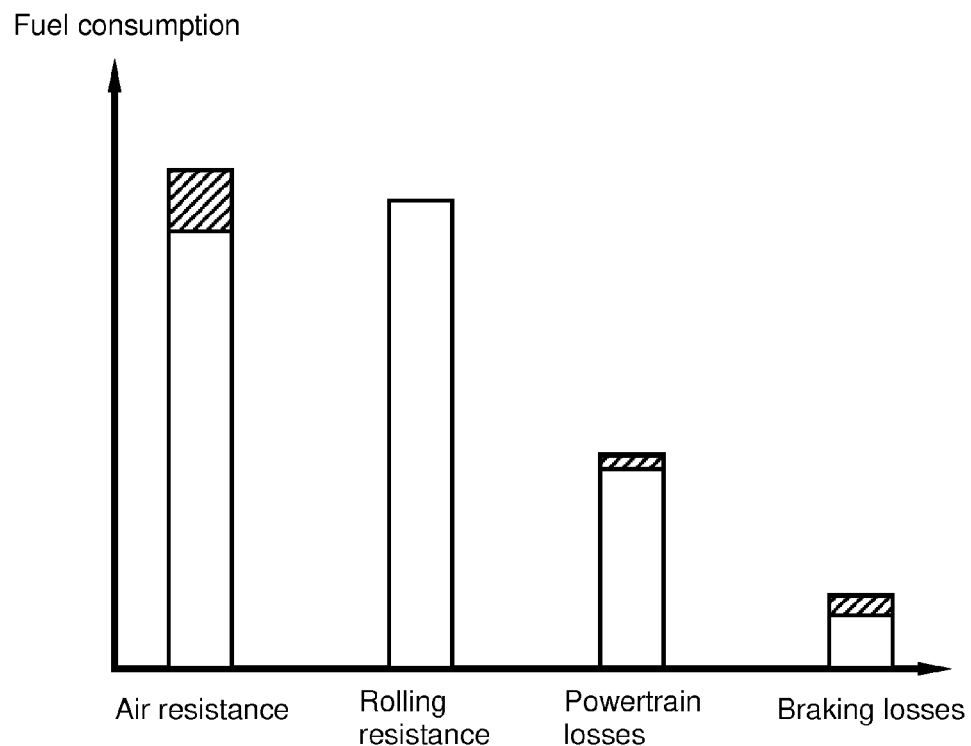
FIG. 3A is an overview showing the current and potential fuel consumptions according to one embodiment of the invention.

FIG. 3A shows another example of how fuel consumption in the vehicle 100 may be distributed over a number of fuel consumers, and the consequences of the driving style on fuel consumption may be illustrated in certain embodiments.

FIG. 3A shows how certain driving style dependent fuel consumers vary in fuel consumption with varying driving style, in the case illustrated a reduction of the driving speed from 89 km/h to 85 km/h.

In the illustrated, non-limiting example, fuel consumption for each of the four fuel consumers air resistance, rolling resistance, powertrain losses and braking losses are shown at 89 km/h as the respective bar's total extension, while the possible saving entailed by reducing the speed to 85 km/h is shown by the respective bar's dashed section. The estimated fuel consumption at 85 km/h for the respective fuel consumer is shown by the respective white bar. As shown, air resistance and braking loss are impacted relatively significantly by a speed reduction while powertrain losses are impacted less and rolling resistance is not impacted at all.

In some embodiments, one, several, certain or all the fuel consumers may be illustrated: the vehicle's kinetic energy, the vehicle's potential energy, the vehicle's air resistance, the vehicle's rolling resistance, friction losses in the vehicle's engine 110, powertrain losses in the vehicle 100, braking losses, energy consumption in the auxiliary systems in the vehicle 100, energy loss as a consequence of the combustion efficiency in the vehicle's engine 110.

Also, the illustrated alternative driving style may comprise one, several, certain or all of for example: different gear selection, different engine speed, reduced use of brakes, more cautious acceleration, free-wheel driving on a downhill slope etc.

In certain embodiments, or additionally, a potential fuel consumption, resulting from a certain vehicle related measure, may be illustrated, for instance one, several, certain or all of: increasing the air pressure in the tyres, changing the wheel bearings, adjusting the wheel alignment, changing the tyres, changing the tread, adjusting an abutting brake, releasing the hand brake, a lower vehicle load, driving with a different type of trailer, replacing spoilers, changing of oil, discontinuing the air conditioning system (AC), turning off the dipped lights (in countries where the law allows driving without dipped beam headlights in daytime), adjusting the number of driving shafts and/or support shafts engaged in a potential bogie, adjusting the number of driving shafts, refilling fuel additives, changing the air filter, etc.

In some embodiments the lengthened travel time resulting from the alternative driving style may also be illustrated, especially in the case of reduced vehicle speed. In addition, in some embodiments fuel saving calculated in a suitable currency, if the alternative driving style is applied, may be displayed.

In some embodiments the calculation device 131 receives measurement data from one or several sensors and/or accelerometers, placed in the vehicle 100, while the vehicle is being driven. Examples of such sensors may be a vertical indicator, to determine whether the vehicle 100 is driving on a slope; a distance meter which measures the distance to the vehicle ahead; an obstacle detector, which enables a determination of whether a braking is/was necessary or whether engine braking could have been carried out; wheel spin detector, which detects if any/several driving wheels are losing their grip and start to skid against the base; etc.

Also, the calculation device 131 may in some embodiments receive data from a Global Position Satellite (GPS) detector in the vehicle 100. Thus the vehicle's current position may be established. Also, the distance travelled, remaining distance to the destination, topographical driving conditions and similar may be established. Values received from sensors and/or accelerometers and/or GPS may then in some embodiments be stored in a memory, with time information. This is facilitated by the fact that GPS may advantageously be adapted to be connected to a map database which may contain information regarding road incline, curve radius, speed limits etc.

Subsequently a distribution of fuel consumption/energy loss (these two terms, which relate to the same thing, are used interchangeably in this text) over the selected fuel consumers may be carried out. In some cases, the calculation of a fuel consumer's energy loss, or percentage share of the vehicle's total energy loss may be based on measurement values and in other cases on estimates, or a combination of these.

Some examples of how certain consumers' energy loss may be calculated will now be discussed.

The total force which impacts the vehicle 100 from the environment, $F_{env}$, consists of rolling resistance $F_{roll}$, gravitation F and air resistance $F_{air}$. Gravitation is calculated according to $$F = m \cdot g \cdot \alpha,$$

where m is the vehicle's mass, g is the gravitation constant, which may be approximated at 9.82 and a is the incline of the road in radians. Since there are mostly small angles, sin(a) may be approximated to a. The air resistance may be calculated as a factor k multiplied by the speed square, according to:

$$F_{env} = F_{roll,present} + m \cdot 9.82 \cdot \alpha + k \cdot v^2$$

$$F_{roll,present} = F_{roll,est}, \quad m = m_{est}, \quad k = \tfrac{1}{2} \rho \cdot C_d \cdot A$$

where A is the vehicle's frontal area, $C_d$ is the resistance coefficient which depends on the vehicle's fairing, p is the air's density, m is the vehicle's mass, which may for example be estimated by the vehicle's mass estimation system as $m_{est}$.

The current rolling resistance, $F_{roll,present}$ is also estimated continuously in the vehicle 100 as $F_{roll,est}$.

Thus energy consumption for air resistance and rolling resistance may be calculated, respectively.

For the calculation of $m_{est}$ and $F_{roll,est}$ reference is made to the doctoral thesis "Fuel Optimal Powertrain Control for Heavy Trucks Utilizing Look Ahead" by Maria Ivarsson, Linköping 2009, ISBN 978-91-7393-637-8.

Calculation of fuel consumption may be complex since it may be impacted by many variables. Here we present a manner of calculating this according to some embodiments, with an approximation with a flat road, linear engine:

Total Loss of Output:

$$P_{losses} = P_{air} + P_{roll} + P_{fricPT} + P_{fricEng} + P_{brake}$$

Air Resistance Effect:

$$P_{air} = F_{air} \cdot v_{veh} = A_{veh} \frac{\rho_{air} \cdot C_d}{2} v_{veh}^3$$

where A is the vehicle's frontal area, $C_d$ is the resistance coefficient which depends on the vehicle's airing, $\rho$ is the air's density.

Rolling Resistance Effect:

$$P_{roll} = F_{roll} v_{veh}$$

Where F is the rolling resistance force and v is the vehicle's speed.

Powertrain/Engine Losses:

$$P_{fricPT} = |T_{flywheel} \cdot \omega_{flywheel} \cdot \eta_{PT}|$$

$$P_{fricEng} = T_{engDragLoss}(\omega_{flywheel}) \cdot \omega_{flywheel}$$

Engine Torque/Revolutions:

$$T_{flywheel} = (F_{roll} + F_{air} + m_{veh} g \sin\alpha) \cdot \frac{1}{\eta_{PT}}$$

$$\omega_{flywheel} = \frac{v_{veh}}{r_{wheel}} \cdot i_{finaldrive} \cdot i_{gearbox}$$

The parameter energy loss/distance may be calculated as:

$$E_{loss}/100 \text{ km} = P \cdot \frac{100000}{v_{veh}}$$

Energy may be converted to diesel by:

$$\text{Fuel}[L] = \frac{E_{loss}}{H_{diesel}} \eta_{engine} \approx \frac{E_{loss}}{35 \cdot 10^6} \cdot 0.45$$

According to one embodiment, a representation of converted energy is accumulated for a number of consumers, such as two or more of those previously mentioned, where one representation of converted energy may be accumulated for each energy consumer separately. This energy consumption may then be presented for each one of the consumers as done for example in FIG. 3. By subsequently analysing the energy consumption's distribution between the different consumers, an assessment may be made of the manner in which the vehicle 100 has been driven, for example by a comparison with fuel optimised driving. The estimated energy amount may also be transferred to a place located at a distance, such as for example an FMP or a transport central for a vehicle fleet, where several vehicles 100 may be evaluated centrally, and also the driver 101 in cases where the same driver 101 usually drives several vehicles 100.

A high energy consumption via air resistance may indicate that the vehicle 100 has been driven with unnecessarily high speed. The presentation of converted energy may be combined with providing tips for improvements to the driver 101. One example of such a tip may thus be to reduce speed in order to reduce the impact of air resistance.

By measuring and reporting how much energy has been used in braking, i.e. the size of the energy consumer's braking force, a measure of how the vehicle 100 has been driven by the vehicle's driver 101 is obtained. It is desirable to have as low an energy amount as possible, since the higher the energy amount which has been used in braking, the less foresight the driver 101 has shown when driving the vehicle 100. This is discussed further in connection with FIG. 3B.

By illustrating this information and letting the driver 101 take part of this information, for example in the form of energy amount or translated into fuel amount and/or fuel cost in order to further underline the cost it entails to drive the vehicle 100 in a manner which gives rise to extensive braking, the driver 101 may be alerted to the size of the cost which is actually used for braking. With the objective of reducing the share of energy which is used in braking, the driver 101 may be provided with tips via the vehicle's braking system, so that the system may for example suggest that the driver 101 maintain a longer distance to the vehicle in front. This tip may also in some embodiments be based on measuring the distance to the vehicle in front with an instrument. The estimated energy amount which is used in braking via a braking system also constitutes a measure of how the vehicle 100 has been driven, so that this energy amount may advantageously be used to evaluate and compare drivers 101 according to some embodiments.

As mentioned, the energy consumption for each energy consumer may be calculated and reported instantly, that is to say in real time, or nearly real time, in some embodiments. In other embodiments, the allocated energy consumption may be accumulated for an entire vehicle journey. The accumulated energy consumption may also be estimated for other periods than an entire vehicle journey, for example one may calculate how the rolling resistance, or the rolling resistance coefficient, changes over time in a trend graph. Thus it is possible to detect whether for example a trend break has arisen, which may indicate that some form of measure may be required. The accumulated energy consumption may for example be reset at any of the following points in time: at the start-up of the vehicle 100, i.e. each time the vehicle's combustion engine 110 is started or the first time the vehicle's combustion engine 110 is started after a change of day. This alternative is especially applicable for vehicles 100 which usually stand still overnight. Regarding long haulage, the vehicle 100 is often moving during nighttime, so that another suitable time for resetting may be more applicable; when starting a vehicle journey, i.e. when starting a transport from one point A to another point B with the vehicle 100; here, the vehicle journey's start may for example be indicated by the vehicle's driver 101 by way of suitable input, for example via an inputting device such as a pressure sensitive display or similar in some embodiments. During the journey/transport from A to B, the combustion engine 110 may be shut down during e.g. breaks, sea transports, rest etc. without any reset. Also, the accumulated energy consumption may be reset for example at one of the following points in time: each time the vehicle 100 is reloaded, which is often indicated to the control system by the driver 101 of the vehicle, via for example a pressure sensitive display; each time a new driver 101 uses the vehicle 100, or another similar suitable configurable or predetermined point in time.

According to the present example, the invention is implemented in the calculation device 131. The calculation device 131 comprises elements for the receipt of vehicle related signals, such as among others braking system related signals. As mentioned, the vehicle 100 may comprise for example a retarder, an exhaust brake, brake, or engine brake, so that the calculation device 131 comprises elements for receipt of signals with respect to these braking systems, either for example from the control device 115, or directly from each respective braking system separately, or from another applicable control device in embodiments with several control devices. The respective braking systems and/or the braking system device may for example send signals to the calculation device 131 as long as the respective braking system is active.

Also, via the control device 115 there is a large amount of information available in the control systems in the vehicle 100. With the help of these available data, the calculation device 131 may calculate or estimate the energy consumption which, apart from the one or several vehicle internal braking systems, is due to other braking forces or consumers acting in relation to the vehicle 100. Estimation regarding the different consumers may be achieved with the help of among others the above mentioned formulas for calculation. Below are examples of ways of estimating converted energy amounts for different consumers.

A rough estimate of different consumers, such as for example the brake's impact, may be applied in those cases where energy consumption is accumulated for those braking actions which resulted in a speed reduction, and may be obtained by determining the reduction in kinetic energy, that is to say:

$$E_k = \frac{1}{2}mv_1^2 - \frac{1}{2}mv_2^2,$$

it $v_1$ constitutes the vehicle's speed at the start of the brake activation and $v_2$ it constitutes the vehicle's speed when the brake activation is ended. This manner does not, however, take into consideration the speed change which the vehicle 100 would have undergone in any case, for example due to a sloping ground.

In some embodiments, the slope is known through sensor measurements and calculations, or calculations based on for example a GPS-connected map, so that the braking energy may be estimated as the difference in kinetic energy+the difference in potential energy.

One may also set up the whole energy equation:

$E$brake=Delta$E$kinetic energy+Delta$E$potential–$E$enginefriction–$E$rollingresistance–$E$airresistance(+potential other energy loss).

As we know, energy, E, may be expressed as E=F·s, where F represents force and s represents distance, which is the same as time integrating force and speed. The effect P=F (force acting on the vehicle)·v (vehicle speed), and Energy=Output·time. Since information regarding the vehicle's speed is also available via the vehicle control system, there remains the translation of the resulting braking torque to actual braking force acting on the vehicle's wheels 118, 119.

Energy consumption due to air resistance may be determined with the help of air resistance force $F=\frac{1}{2}\rho ACdv^2$, where p=air density, A=vehicle's area in the travelling direction, v=vehicle's speed relative to the wind, Cd=air resistance coefficient, which depends on the design of the surfaces of the vehicle 100 which meet the wind, and where principally all external details on the vehicle 100 have an impact. The air resistance coefficient may be difficult to calculate, but the air resistance force may for example be estimated by subtracting other counteracting forces form the force which the engine 110 develops (and which is available via the engine control device). These other counteracting forces may comprise rolling resistance, engine friction, gearbox friction, retarder friction in applicable cases, and/or potentially braking friction in addition to the air resistance force. Thus, where the air resistance force is estimated, the air resistance coefficient may also be estimated according to some embodiments, by solving the equation $F=\frac{1}{2}\rho ACdv^2$ for the air resistance coefficient Cd in terms of the other variables.

Alternatively, Cd may be measured, but as soon as for example another trailer is connected, Cd may change. The air resistance may be estimated by the vehicle's control system in some embodiments. The air resistance is, as shown in the equation above, strongly dependent on the vehicle's speed, and generally, at least for vehicle 100 in long haulage traffic with a high medium speed, a large share of the vehicle's total fuel consumption will be spent on overcoming air resistance.

Another energy consumer which gives rise to the vehicle's energy consumption, and which may also be estimated according to the present invention, consists of the vehicle's rolling resistance. The rolling resistance force may be written as F=Cr·N, where Cr constitutes the rolling resistance coefficient, which depends primarily on the vehicle's wheels/tyres, the road base and the normal force N, i.e. the vehicle's prevailing weight has a large significance. The rolling resistance force may also be determined by the vehicle's control systems.

Another energy consumer that gives rise to energy consumption arises from the engine's internal friction, where the friction effect may be calculated as P=M·ω, and thus the energy may be calculated by integrating this effect P over time. M constitutes the brake torque and w the angle rate. The braking force which arises is thus revolution dependent, and thus increases with increasing engine revolutions.

Further, the gearbox friction, which is also revolution dependent, has an impact, so that what is stated regarding calculation in connection with engine friction also applies to the gearbox friction. In addition there is an impact from losses due to gear mesh in the gearbox, which are dependent on the torque transmitted.

Another energy consumer consists of friction losses in the shaft/hub, which are also dependent on rotation speed and thus on vehicle speed and final drive ratio, as well as losses caused by the gear mesh in the gear which are dependent on the torque transmitted.

Other energy consumers consist of the different devices which are operated by the combustion engine, for example air conditioning, fans, etc. There may also be other consumers such as additional devices and other devices for the operation of for example cranes, etc. when the vehicle 100 is at standstill. Likewise, energy consumption may be determined for when the vehicle is idling.

Thus, in addition to consumers that impact the vehicle 100 in particular when it is moving, consumers may also be determined and presented according to the below, regarding energy consumers that impact the vehicle 100 when idling.

In addition to energy consumption data being reported to the vehicle's driver 101, or as an alternative, the above described energy consumption data may also be transmitted, for example via an applicable telecommunications system, to an external device 140, for handling of the vehicle fleet in which the vehicle 100 is included, such as for example a Fleet Management System. Obviously the vehicle 100 may be arranged to continuously send data to the transport management system, so that such data may then be used to evaluate both the vehicle journey, the vehicle 100, the vehicle's components and/or the driver 101. If for example a driver 101 drives different vehicles 100, data may be stored both at vehicle level and driver level in the transport management system, so that both the driver 101 and the vehicle 100 may then be compared with each other with respect to for example vehicle usage and fuel efficiency. Some embodiments thus facilitate an evaluation of the vehicle's driver 101, and also a comparison of for example different drivers 101, who drive the same vehicle 100 at different points in time.

Figure 3B:
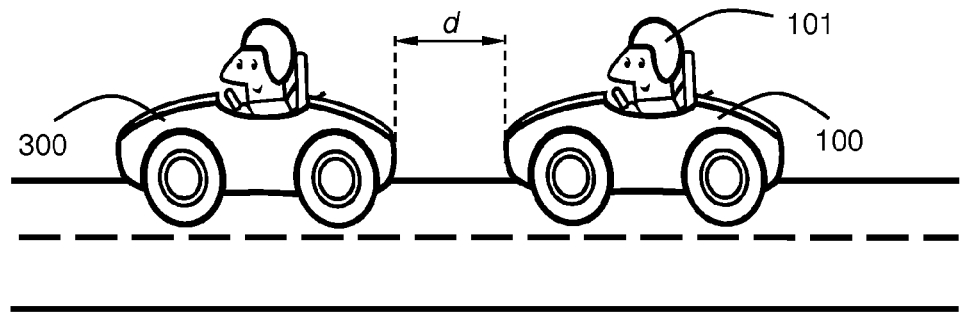
FIG. 3B is an overview showing how a parameter impacts the current and/or potential fuel consumption according to one embodiment of the invention.

FIG. 3B shows an example of an embodiment where the distance d between the vehicle 100 and the vehicle 300 ahead is detected. The detected distance d may then be compared in the calculation device 131 with a previously determined, or configurable, threshold value $d_{OK}$, which threshold value specifies a distance which is deemed suitable as a minimum distance for the vehicles 100 and 300 at the given speed. Where the calculation device 131, in a comparison of the detected distance d and the threshold value $d_{OK}$ concludes that the distance d is below the threshold value $d_{OK}$, a warning message is sent to the driver 101 in some embodiments, according to some embodiments to be displayed on the display 130. Further, in some embodiments a calculation may be made of how much less braking would have been required if a little more distance had been kept to the vehicle ahead.

Figure 3C:
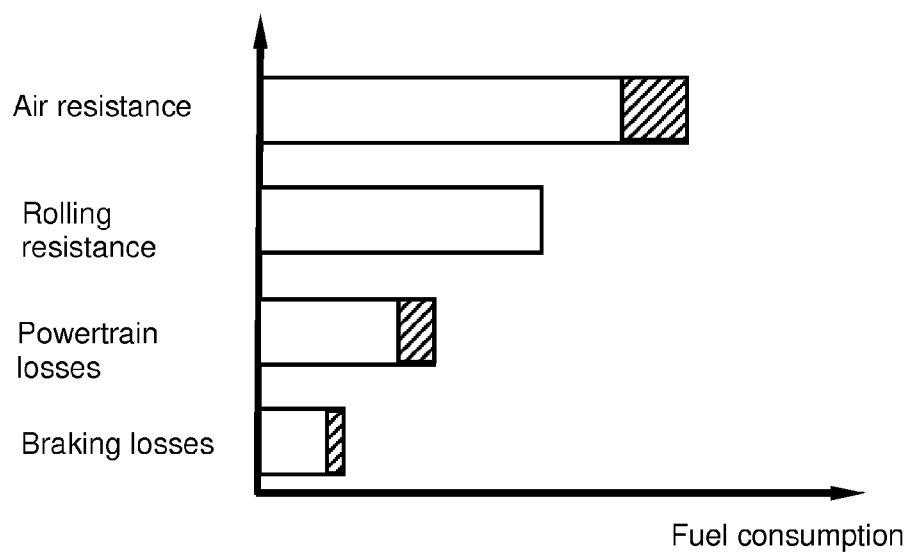
FIG. 3C is an overview showing the current and potential fuel consumption according to one embodiment of the invention.

FIG. 3C shows another example of how fuel consumption in the vehicle 100 may be distributed over a number of fuel consumers, and how the effects of a driving style on fuel consumption may be illustrated in some embodiments.

FIG. 3C shows how some driving style dependent fuel consumers vary in fuel consumption as the driving style varies. In the illustrated example, this alternative driving style consists of three components, which the driver 101 may apply jointly, or separately, and thus achieve different fuel savings with respect to different fuel consumers. These three components in the alternative driving style comprise upshift to a higher gear, increased distance to the vehicle ahead, and reduced vehicle speed.

The illustrated example shows how the engine's trailer losses and also powertrain losses decrease on an upshift to gear 12 from gear 11, the potential saving which this entails being shown by the dashed section of each respective bar.

As shown, air resistance and powertrain losses are impacted relatively significantly by a gear change, while braking losses are impacted less and rolling resistance is not impacted at all.

By also, or instead, increasing the distance to the vehicle ahead, the braking losses decrease, since the driver 101 may plan the speed change better and engine brake instead of standing on the brake pedal when the vehicle ahead brakes. The distance to the vehicle ahead may be calculated with the help of sensor signals according to the discussion in connection with FIG. 3B. It is also conceivable that the air resistance increases somewhat since the distance to the vehicle ahead is extended, provided one stays within distances which are currently legal. Other driver measures which may reduce braking losses include releasing the accelerator gas pedal early before a red light, roundabout, junction etc. The presence of, or an approaching obstacle or speed limiting road measure may be detected by analysis of a GPS signal combined with a map or map-linked information. Another way of reducing braking losses is to reduce speed before downhill slopes. Downhill slopes may also be detected by analysis of a GPS signal in combination with a map or map-linked information; alternatively, or as a complement, a slope detector may also be used.

In addition, as previously illustrated in FIG. 3A, energy losses may be reduced by reducing speed. This applies especially to energy losses due to air resistance, since this is proportional to the square of the vehicle's speed.

In some embodiments, one, some, certain or all the fuel consumers may be illustrated: the vehicle's kinetic energy, the vehicle's potential energy, the vehicle's air resistance, the vehicle's rolling resistance, friction losses in the vehicle's engine 110, powertrain losses in the vehicle 100, braking losses, energy consumption in the auxiliary systems in the vehicle 100, energy loss as a consequence of the combustion efficiency in the vehicle's engine 110.

Also, the illustrated alternative driving style may comprise one, several, certain or all of for example: different gear selection, different engine speed, reduced use of brakes, more cautious acceleration, free-wheel driving on a downhill slope etc.

In certain embodiments, or additionally, a potential fuel consumption, resulting from a certain vehicle related measure, may be illustrated, for instance one, several, certain or all of: increasing the air pressure in the tyres, changing the wheel bearings, adjusting the wheel alignment, changing the tyres, changing the tread, adjusting an abutting brake, releasing the hand brake, a lower vehicle load, driving with a different type of trailer, replacing spoilers, changing of oil, discontinuing the air conditioning system (AC), turning off the dipped lights (in countries where the law allows driving without dipped beam headlights in daytime), adjusting the number of driving shafts and/or support shafts engaged in a potential bogie, adjusting the number of driving shafts, refilling fuel additives, changing the air filter, etc.

In addition, in some embodiments fuel saving calculated in a suitable currency, if the alternative driving style is applied, may be displayed.

Figure 4:
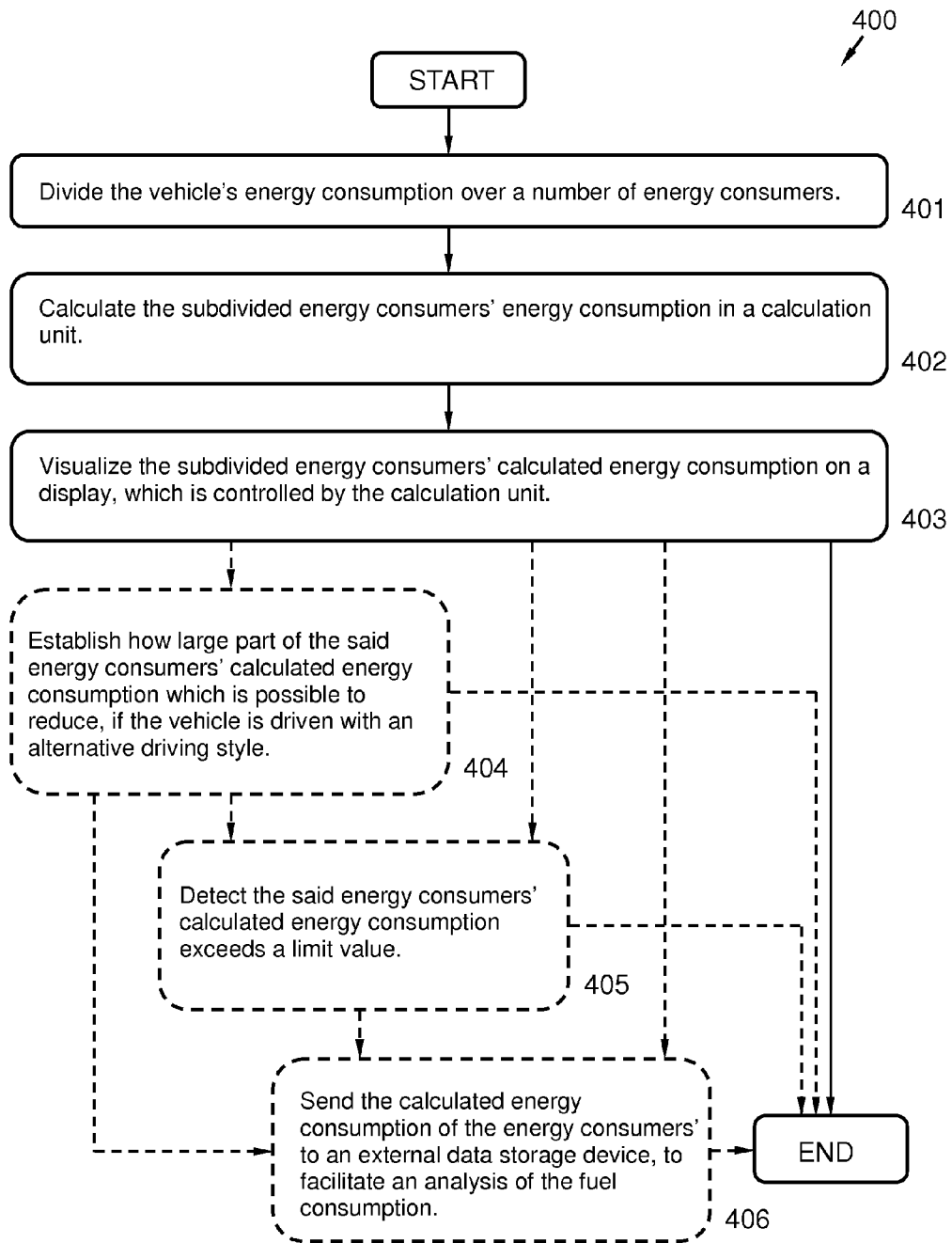
FIG. 4 is a flow diagram illustrating one embodiment of a method for causal analysis of fuel consumption in a vehicle.

FIG. 4 illustrates an example of an embodiment of the invention. The flow diagram in FIG. 4 illustrates a method 400 for causal analysis of fuel consumption in a vehicle 100, which is driven by a driver 101.

The purpose of the method is to distribute fuel consumption in the vehicle 100 over a number of fuel consumers and illustrate this fuel consumption distributed over the respective divided fuel consumers.

In order to be able to distribute fuel consumption in the vehicle 100 to fuel consumers correctly, the method 400 may comprise a number of steps 401-406. It should be noted, however, that some of the steps described herein are only included in certain alternative embodiments of the invention, such as e.g. step 404, 405 and/or 406. Further, the steps 401-406 described herein may be carried out in a somewhat different chronological order than suggested by the numbering, and some of these may be completed in parallel with each other. The method 400 comprises the following steps:

Step 401

A division of the vehicle's energy consumption is carried out over a number of consumers.

At least one of the subdivided consumers may be impacted by the driver's driving style, in some embodiments. Further, the division of consumers may comprise at least one of the subdivided energy consumers, which is not directly impacted by the driver's driving style.

In some embodiments a division may be made between two groups of consumers; those which are impacted by the driver's driving style and those which are not impacted.

The consumers over which the vehicle's energy consumption was distributed may comprise one, several or all of: the vehicle's kinetic energy, the vehicle's potential energy, the vehicle's air resistance, the vehicle's rolling resistance, friction losses in the vehicle's engine 110, powertrain losses in the vehicle 100, braking losses, energy consumption in the auxiliary systems in the vehicle 100, energy loss as a consequence of the combustion efficiency in the vehicle's engine 110.

Thus, by making such a division of energy consumption, it is possible to study how energy consumption in the vehicle 100 is allocated to different items. Thus a tool is also provided, which may be used as a basis for analysis of unnecessary energy leakages and thus to reduce the vehicle's energy consumption with different measures.

Step 402

The energy consumption of the subdivided consumers is calculated in a calculation device 131.

In some embodiments, which comprise a calculation of, and comparison with, an alternative driving style, a calculation of the time difference which the alternative driving style would have entailed for a driving distance, is made in relation to the duration with the driver's actual driving style.

A calculation may in some embodiments be carried out regarding the difference in fuel consumption/fuel cost which the alternative driving style would have entailed for a distance, in relation to the fuel consumption/fuel cost with the driver's actual driving style. Thus the saving in terms of fuel and/or money which the alternative driving style would have entailed may be illustrated.

The calculation of the subdivided 401 consumers' energy consumption may be done in real time in some embodiments. Thus the driver 101 is provided a direct feedback with respect to driving style. He/she may experiment to achieve a driving style which is optimal in terms of fuel efficiency and leads to a minimum of energy losses. Thus, the amount of energy losses due to the driver or the driving style, may be reduced.

The calculation of the energy consumption by the subdivided 401 energy consumers may alternatively be made over a configurable time period. Thus an overview of historic energy consumption is obtained, and detection of a long term trend may be facilitated. The result of a driver replacement may for example be observed, or how the rolling resistance in the vehicle 100 changes over time until it reaches a point where a service measure may be justified.

The calculation of the energy consumption by the subdivided 401 energy consumers may in some embodiments comprise gathering of at least one measured parameter value related to the vehicle's energy consumption.

The gathered measured parameter value related to the vehicle's energy consumption is gathered from one or several sensors and comprises one, several or all of: road slope, curve radius, traffic ahead of the vehicle 100, distance to the vehicle ahead, roundabout detection, junction detection, red light indication, road condition, temperature, spinning detection on driving wheels, air pressure in the vehicles' tyres.

By measuring such parameter value, a better calculation or estimation may be carried out of at least one energy consumer, which impacts such parameter. For example, the air resistance is impacted by temperature, to mention one conceivable example.

Step 403

The energy consumption calculated 402 for the subdivided 401 consumers is visualised on a display 130, which is controlled by the calculation device 131. Thus the vehicle's energy losses may be visualised.

According to some embodiments, said calculated 402 energy consumption of the consumers is visualised, as is the established reduction of energy consumption, associated with an alternative driving style. As a result, a comparison between the actual driving style and an alternative driving style may be made, so that the difference between them may be shown.

In some embodiments, an estimated time difference 402 between a certain driving distance driven with the driving style actually used, and driven with an alternative driving style, is visualised.

The visualisation of the said consumers' calculated 402 energy consumption may alternatively also comprise showing the said difference in fuel consumption/fuel cost. Thus the saving which the alternative driving style would have entailed may be illustrated.

The visualisation of the subdivided 401 energy consumers' energy consumption may in some embodiments be made in real time. Thus the driver 101 is provided a direct feedback with respect to driving style. He/she may experiment to achieve a driving style which is optimal in terms of fuel efficiency and leads to a minimum of energy losses. Thus the amount of driver-related energy losses may be reduced.

The visualisation of the subdivided 401 energy consumers' energy consumption may in some embodiments be made over a configurable time period. In one alternative embodiment, the visualisation of the subdivided 401 consumers' calculated 402 energy consumption may comprise an accumulated trend graph, where a change of the consumers' energy consumption over time is visualised. This period may for example be the life of the vehicle, the period since the vehicle 100 was purchased, or another configurable period of time.

Step 404

This method step may be carried out in certain alternative embodiments of the method 400.

According to these alternative embodiments, it is determined how large a part of said energy consumers' calculated 402 energy consumption it is possible to reduce, if the vehicle 100 is driven with an alternative driving style. Thus an assessment may be made of how much fuel and thus money which may be saved if the alternative driving style is applied.

Step 405

This method step may be carried out in certain alternative embodiments of the method 400.

According to these alternative embodiments, a detection of how the calculated 402 energy consumption of said energy consumers exceeds a limit value may be carried out. Such a limit value may be predetermined or configurable, in some embodiments. One example of a limit value for rolling friction may be 10% over the average rolling friction when the vehicle 100 is driven on an asphalted road. This non-limiting example of a limit value may be varied.

The detection of the exceeded limit value may in some embodiments entail a visualisation 403 of this in the form of a measure recommendation.

Thus, for example, a recommendation to control why rolling friction has increased above a certain limit value, which may indicate that the wheel alignment needs to be adjusted or that the brakes are applied, may be sent from the calculation device 131 and visualised to either of the driver 101 or the vehicle's owner.

Step 406

This method step may be carried out in certain alternative embodiments of the method 400.

According to these alternative embodiments, the calculated 402 energy consumption of the subdivided 401 energy consumers is sent to an external data storage device 140, to facilitate an analysis of the fuel consumption in the vehicle 100-.

Such an external data storage device 140 may consist of a Fleet Management System (FMS). By sending the consumers' energy consumption to the external data storage device 140, the vehicle's owner may track the vehicle's fuel loss trend. For example, an increased rolling friction may indicate that the vehicle 100 may need an overhaul. Further, the driving styles of different vehicle drivers 101 may be studied and fuel efficient vehicle drivers 101 may be rewarded with a bonus system, while less fuel efficient vehicle drivers 101 may be subject to a package of measures in the form of training or special driving training.

Figure 5:
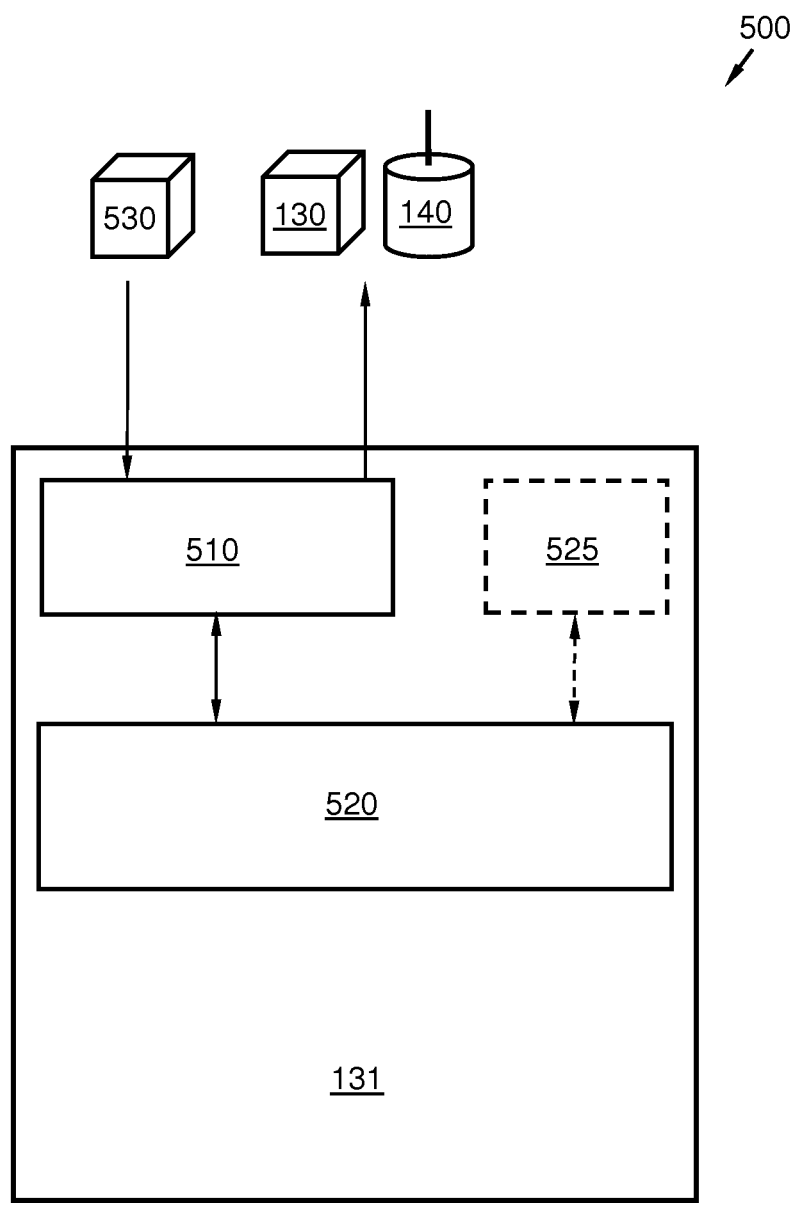
FIG. 5 is an illustration of a calculation device for causal analysis of fuel consumption in a vehicle, according to one embodiment of the invention.

FIG. 5 illustrates an embodiment of a calculation device 131 for causal analysis of fuel consumption in a vehicle 100, which is driven by a driver 101.

This calculation device 131 is configured to carry out at least some of the previously described method steps 401-406, comprised in the description of the method 400 for causal analysis of fuel consumption in the vehicle 100. A system 500, comprising the calculation device 131 and a display 130 is also illustrated in the figure.

In order to analyse the fuel consumption in the vehicle 100 correctly, the calculation device 131 comprises a number of components, which are described in more detail in the text below. Some of the partial components described only occur in certain, but not necessarily all, embodiments. There may also be additional electronics in the calculation device 131, which is not entirely necessary in order to understand the function of the calculation device 131 according to the invention.

Further, the calculation device 131 comprises a communications module 510, arranged to communicate the consumers' calculated energy consumption to the display 130, for visualisation.

The calculation device 131 comprises a processor circuit 520, arranged to calculate the consumers' energy consumption and also arranged to control a display 130.

In some embodiments, the previously mentioned communications module 510 may also be arranged to send the consumers' calculated energy consumption to an external data storage device 140, to facilitate an analysis of the fuel consumption in the vehicle 100 according to some embodiments. This communication may be made via wired or wireless communication to the external data storage device 140.

In another embodiment, the communications module 510 may also be arranged to collect a measured parameter value related to the vehicle's energy consumption from a sensor 530.

Such collected measured parameter value, which in some embodiments may be collected from the sensor 530, may comprise one, several or all of: road slope, curve radius, traffic ahead of the vehicle 100, distance to the vehicle ahead, roundabout detection, junction detection, red light indication, road condition, temperature, spinning detection for driving wheels, and/or air pressure in the vehicles' tyres. Such parameter value or measurement result may be received through a wireless or wired interface from the sensor 530, or through a measuring device.

The sensor 530 may in some embodiments consists of for example a hydrometer, thermometer, camera, infra-red camera, movement detector, microphone, range finder, laser, or similar.

The communications module 510 may in some embodiments consist of a separate sender and receiver. The communications module 510 may in some embodiments consist of a transceiver, which is adapted to send and receive radio signals, and where parts of the construction, such as the antenna, are joint to sender and receiver. Further, the communications module 510 may be adapted for wireless information transfer, via radio waves, WLAN, Bluetooth or infra-red sender/receiver module. However, the communications module 510 may in some embodiments be specifically adapted for wired information exchange with a sensor, measuring device and/or the vehicles' data bus.

The previously mentioned processor circuit 520 may in some embodiments be adapted to divide the vehicle's energy consumption over one or several energy consumers comprising one, several or all of: the vehicle's kinetic energy, the vehicle's potential energy, the vehicle's air resistance, the vehicle's rolling resistance, losses in the vehicle's engine 110, powertrain losses in the vehicle 100, braking losses, energy consumption in auxiliary systems in the vehicle 100, energy losses as a result if combustion efficiency in the vehicle's engine 110.

According to some embodiments, at least one of the subdivided energy consumers may be impacted by the driver's driving style, where the processor circuit 520 may also be arranged to establish how large a part of the said energy consumer's calculated energy consumption may be reduced, if the vehicle 100 is driven with an alternative driving style. According to some embodiments, the processor circuit 520 may also be arranged to control the display 130 to show the established reduction of energy consumption, associated with the alternative driving style.

The processor circuit 520 may also in some embodiments be arranged to calculate the time difference which the alternative driving style would entail along a certain driving distance, in relation to the duration with the driving style actually used by the driver. In addition, the processor circuit 520 may be arranged to control the display 130, so that it also shows said calculated time difference.

The processor circuit 520 may also, in some embodiments be arranged to calculate the difference in fuel consumption/fuel cost which the alternative driving style would entail for a certain driving distance, in relation to the fuel consumption/fuel cost with the driving style actually used by the driver. Further, the processor circuit 520 may also be arranged to control the display 130, to also show the calculated difference in fuel consumption/fuel cost.

According to some embodiments, at least one energy consumer is not directly impacted by the driver's driving style, so that the processor circuit 520 may also be arranged to detect that/when said energy consumer's calculated energy consumption exceeds a limit value.

The processor circuit 520 may also be arranged to control the display 130 to visualise a detected exceeded limit value in the form of a measure recommendation, in some embodiments.

Further, the processor circuit 520 may also in some embodiments be arranged to calculate the consumers' energy consumption in real time and to control the display 130 to visualise the consumers' energy consumption in real time.

In some alternative embodiments, the processor circuit 520 may also be arranged to calculate and control the display 130 to visualise the consumers' energy consumption over a configurable time period.

In another embodiment the processor circuit 520 may also be arranged to calculate the consumers' energy consumption by collecting, via the communications module 510, a measured parameter value related to the vehicle's energy consumption.

Such collected measured parameter value related to the vehicle's energy consumption may in some embodiments be collected from a sensor 530 and comprise one, several or all of: road slope, curve radius, traffic ahead of the vehicle 100, distance to vehicle ahead, roundabout detection, junction detection, red light indication, road condition, temperature, spinning detection for driving wheels, and/or air pressure in the vehicle's tyres. Such parameter value or measurement result may be received through a wireless or wired interface from a sensor or through a measuring device.

The processor circuit 520 may also be arranged to facilitate the visualisation of the divided consumers' calculated energy consumption in an accumulated trend graph, where a change of the consumers' energy consumption over time may be calculated and visualised.

The processor circuit 520 may consist of, for example, one or several Central Processing Units (CPU), a microprocessor or other logic designed to interpret and carry out instructions and/or to read and write data. The processor circuit 520 may handle data for inflow, outflow or data processing of data, comprising also buffering of data, control functions and similar.

In some alternative embodiments, the calculation device 131 comprises a memory device 525, which constitutes a storage medium for data. The memory device 525 may for example consist of a memory card, flash memory, USE-memory, hard disk or other similar data storage device, for example one from the group: ROM (Read-Only Memory), PROM (Programmable Read-Only Memory), EPROM (Erasable PROM), Flash-memory, EEPROM (Electrically Erasable PROM), etc. in various embodiments.

Further, the invention comprises a computer program for causal analysis of fuel consumption in a vehicle 100, which is driven by a driver 101. The computer program is arranged to execute the method 400 according to at least one of the previously described steps 401-406, when the computer program is executed in a processor circuit 520 in the calculation device 131.

The method 400 according to the steps 401-406 for causal analysis of fuel consumption may be implemented by one or several processor circuits 520 in the calculation device 131, jointly with the computer program code, in order to carry out one, several, certain or all of the steps 401-406 described above. Thus, a computer program comprising instructions to execute the steps 401-406 may then be loaded in the processor circuit 520.

Figure 6:
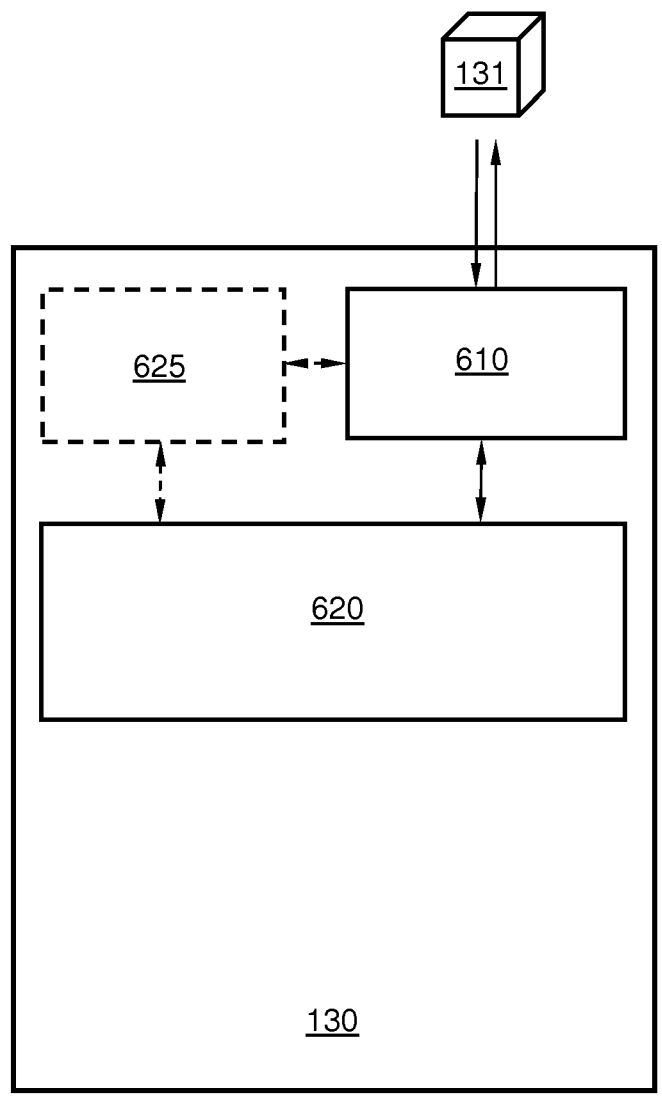
FIG. 6 is an illustration of a display for causal analysis of fuel consumption in a vehicle, according to one embodiment of the invention.

FIG. 6 shows a display 130. The display 130 is arranged to provide, or visualise fuel consumption in a vehicle 100, which is driven by a driver 101. The fuel consumption may be divided over at least one energy consumer, and thus facilitate a causal analysis of fuel consumption.

In order to provide the measurement result of at least one driver dependent physical parameter correctly, the display 130 contains a number of components, which are described in more detail in the text below. Some of the partial components described only occur in certain embodiments.

Additional electronic components, which may be comprised in the display 130, but which are not strictly necessary in order to understand the function of the display 130 according to the invention, have been omitted from FIG. 6 to not unduly complicate understanding of the invention.

The display 130 comprises a communications module 610. The communications module 610 is arranged to receive an energy consumer's calculated energy consumption from a calculation device 131, for visualisation of this.

Further, the display 130 comprises an element 620 for visualisation of the energy consumer's calculated energy consumption received.

Such element 620 may in some embodiments comprise a monitor, also called computer monitor, which is an output device showing an electronically created text or image. Via analogue, electrical oscillations from another device, an image may be created with the help of an electron beam on a plate made of luminescent materials with many small holes. Examples of potential viewing formats may be 16:10, 4:3 and/or 16:9 in different embodiments. Further, the element 620 may comprise a cathode ray tube screen, a so-called CRT-screen in some embodiments. In other embodiments, such a screen may be a liquid crystal display screen (LCD), a plasma screen, an SED-screen (Surface-conduction electron-emitter display) and/or OLED (Organic light-emitting diode), to mention a few different examples of monitors.

In some alternative embodiments, the display 130 comprises a memory device 625, which constitutes a storage medium for data. The memory device 625 may for example consist of a memory card, flash memory, USB-memory, hard disk or other similar data storage device, for example one from the group: ROM (Read-Only Memory), PROM (Programmable Read-Only Memory), EPROM (Erasable PROM), Flash-memory, EEPROM (Electrically Erasable PROM), etc. in various embodiments.

The above mentioned communications module 610 may in some embodiments be arranged to communicate signals wirelessly or by wire to the calculating device 131.

The communications module 610 may in some embodiments consist of a separate sender and receiver. The communications module 610 may in some embodiments consist of a transceiver, which is adapted to send and receive radio signals, and where parts of the construction, for example the antenna, are joint to sender and receiver. Further, the communications module 610 may be adapted for wireless information transfer, via radio waves, WLAN, Bluetooth or infra-red sender/receiver module. However, the communications module 610 may in some embodiments be especially adapted for wired information exchange with the calculation device 131 and/or the vehicle's data bus.

Further, some embodiments of the invention comprise a system 500 for causal analysis of fuel consumption in a vehicle 100. This vehicle 100 is driven, or may be driven by a driver 101.

This system 500 comprises a calculation device 131 according to one of the embodiments described in connection with the presentation of FIG. 5, adapted for causal analysis of fuel consumption in a vehicle 100. Further, the system 500 also comprises a display 130 according to one of the embodiments which is described in connection with the presentation of FIG. 6, adapted for causal analysis of fuel consumption in a vehicle 100.

Some embodiments of the invention also comprise a vehicle 100, which comprises the above described system 500.

According to some alternative embodiments, the vehicle 100 also comprises, or may be connected to, a device to establish geographical position, such as a GPS module. This alternative device is specifically adapted to establish the vehicle's existing position, and facilitates for example a storage or marking, to mark the position for the vehicle 100.

The present invention may be used both for pedal driving, i.e. when the driver 101 regulates torque request from the engine 110 himself, and during cruise control. The term pedal driving comprises, here and in this document, essentially all kinds of controls designed to control torque request, such as for example an accelerator pedal or a hand gas device.

The invention claimed is:

1. A method for determining fuel/energy consumption in a vehicle, which is driven by a driver, the method comprising:
   collecting measurement data from a plurality of different function sensors in the vehicle;

dividing fuel/energy consumption of the vehicle over a plurality of fuel/consumers which are respectively associated with different categories of the fuel/energy consumption, wherein some of the categories are impacted by the driver's driving style and others of the categories are not impacted by the driver's driving style;

separately calculating each of the subdivided fuel consumers' fuel/energy consumption subdivided into the categories in a calculation device based on the collected measurement data; and determining the fuel/energy consumption in the vehicle sub-divided by the categories.

2. A method according to claim 1, further comprising visualizing the determined fuel/energy consumption in the vehicle sub-divided by the categories on a display and controlling the display by the calculation device.

3. A method according to claim 1, wherein the categories into which the fuel/energy consumers are divided comprise at least several of: the vehicle's kinetic energy, the vehicle's potential energy, the vehicle's air resistance, the vehicle's rolling resistance, friction losses in the vehicle's engine, powertrain losses in the vehicle, braking losses, energy consumption in the auxiliary systems in the vehicle, and energy loss as a consequence of the combustion efficiency in the vehicle's engine.

4. A method according to claim 1, wherein at least one of the subdivided fuel/energy consumers is configured such that it may be impacted by the driver's driving style, and wherein the method further comprises:

establishing how large a part of the fuel/consumers' calculated fuel/energy consumption may be reduced, if the vehicle is driven with an alternative driving style.

5. A method according to claim 4, further comprising calculating a time difference which the alternative driving style would have entailed for a driving distance, in relation to a duration with the driver's driving style actually used.

6. A method according to claim 1, wherein at least one of the subdivided fuel/energy consumers is not directly impacted by the driver's driving style, and wherein the method further comprises:

detecting the fact that the fuel/energy consumers' calculated fuel/energy consumption exceeds a limit value.

7. A method according to claim 1, further comprising performing the calculating of the divided fuel/energy consumers' fuel/energy consumption in real time.

8. A method according to claim 1, wherein the calculating of the subdivided fuel/energy consumers' fuel/energy consumption comprises collecting a measured parameter value, which is related to the vehicle's fuel/energy consumption.

9. A method according to claim 8, further comprising the collecting of the measured parameter value related to the vehicle's fuel/energy consumption is from at least one of a sensor, a virtual sensor and information connected to a navigation system, and the parameter comprises at least one of: road slope, curve radius, traffic ahead of the vehicle, distance to the vehicle ahead, roundabout detection.

10. A method according to claim 1, further comprising:

sending the calculated fuel/energy consumption of the categories of subdivided fuel/energy consumers to an external data storage device.

11. A computer program product comprising a non-transitory computer readable medium and a computer program comprising program code contained in the computer-readable medium for determining the fuel/energy consumption in a vehicle, which is driven by a driver, and the program being configured for implementation of the method according to claim 1 when the computer program is executed in a processor circuit in a calculation device.

12. A calculation device for determining fuel/energy consumption in a vehicle which is driven by a driver;

the calculation device comprising a processor circuit configured and operable to:

collect measurement data related to fuel/energy consumption from a plurality of different sensors in the vehicle;

divide the vehicle's fuel/energy consumption over a number of fuel/consumers associated with different categories of fuel/energy consumption of the vehicle, wherein some of the categories of fuel/energy consumption are impacted by the driver's driving style and some of the categories are not impacted by the driver's driving style;

separately calculate each of the subdivided fuel consumers' fuel/energy consumption subdivided into categories in a calculation device based on the collected measurement data; and determine the fuel/energy consumption in the vehicle which has been sub-divided by category of fuel/energy consumption.

13. A calculation device according to claim 12, wherein at least one of the subdivided fuel/energy consumers is configured such that it may be impacted by the driver's driving style, wherein the processor circuit is configured and operable to establish how large a part of the fuel/energy consumers' calculated fuel/energy consumption may be reduced, if the vehicle is driven with an alternative driving style.

14. A calculation device according to claim 13, wherein the processor circuit is also arranged to calculate the time difference which the alternative driving style would entail for a driving distance, in relation to the duration with the driving style actually used by the driver.

15. A calculation device according to claim 13, wherein the processor circuit is also configured and operable to calculate the difference in fuel/energy consumption and/or fuel/energy cost which the alternative driving style would entail for a driving distance, in relation to the fuel/energy consumption and/or fuel/energy cost with the driving style actually used by the driver.

16. A calculation device according to claim 12, wherein at least one fuel/energy consumer may not be directly impacted by the driver's driving style, and wherein the processor circuit is also configured and operable to detect that the fuel/energy consumers' calculated fuel/energy consumption exceeds a limit value.

17. A calculation device according to claim 16, wherein the processor circuit is also configured and operable to control a display configured and operable to visualize a detected exceeded limit value, in the form of a measure recommendation.

18. A calculation device according to claim 12, wherein the processor circuit is also configured and operable to calculate and control a display to visualize the fuel/energy consumers' fuel/energy consumption in real time.

19. A calculation device according to claim 12, wherein the processor circuit is also configured and operable to calculate the fuel/energy consumers' fuel/energy consumption by collecting a measured parameter value related to the vehicle's fuel/energy consumption.

20. A calculation device according to claim 19, further comprising a sensor configured and operable for collecting and measuring of a parameter value related to the vehicle's fuel/energy consumption, a virtual sensor and/or information connected to a navigation system and comprises one, several or all of: road slope, curve radius, traffic ahead of the vehicle, distance to the vehicle ahead, roundabout detection, junction detection, red light indication, road condition, temperature, spinning detection on driving wheels, and air pressure in the vehicles' tires.

21. A calculation device according to claim 12, further comprising a communications module configured and operable to send the fuel/energy consumers' calculated fuel/energy consumption to an external data storage device.

22. A vehicle comprising a calculation device according to claim 12.

* * * * *